Aug. 13, 1968  F. E. SMITH  3,396,611
LUBRICATING SYSTEM FOR A GENEVA MOTION APPARATUS
Filed Jan. 13, 1966  3 Sheets-Sheet 1

INVENTOR
FLOYD E. SMITH
BY Dominick and Stein
ATTORNEY

Aug. 13, 1968    F. E. SMITH    3,396,611

LUBRICATING SYSTEM FOR A GENEVA MOTION APPARATUS

Filed Jan. 13, 1966    3 Sheets-Sheet 2

INVENTOR
FLOYD E. SMITH

BY Dominik & Stein
ATTORNEY

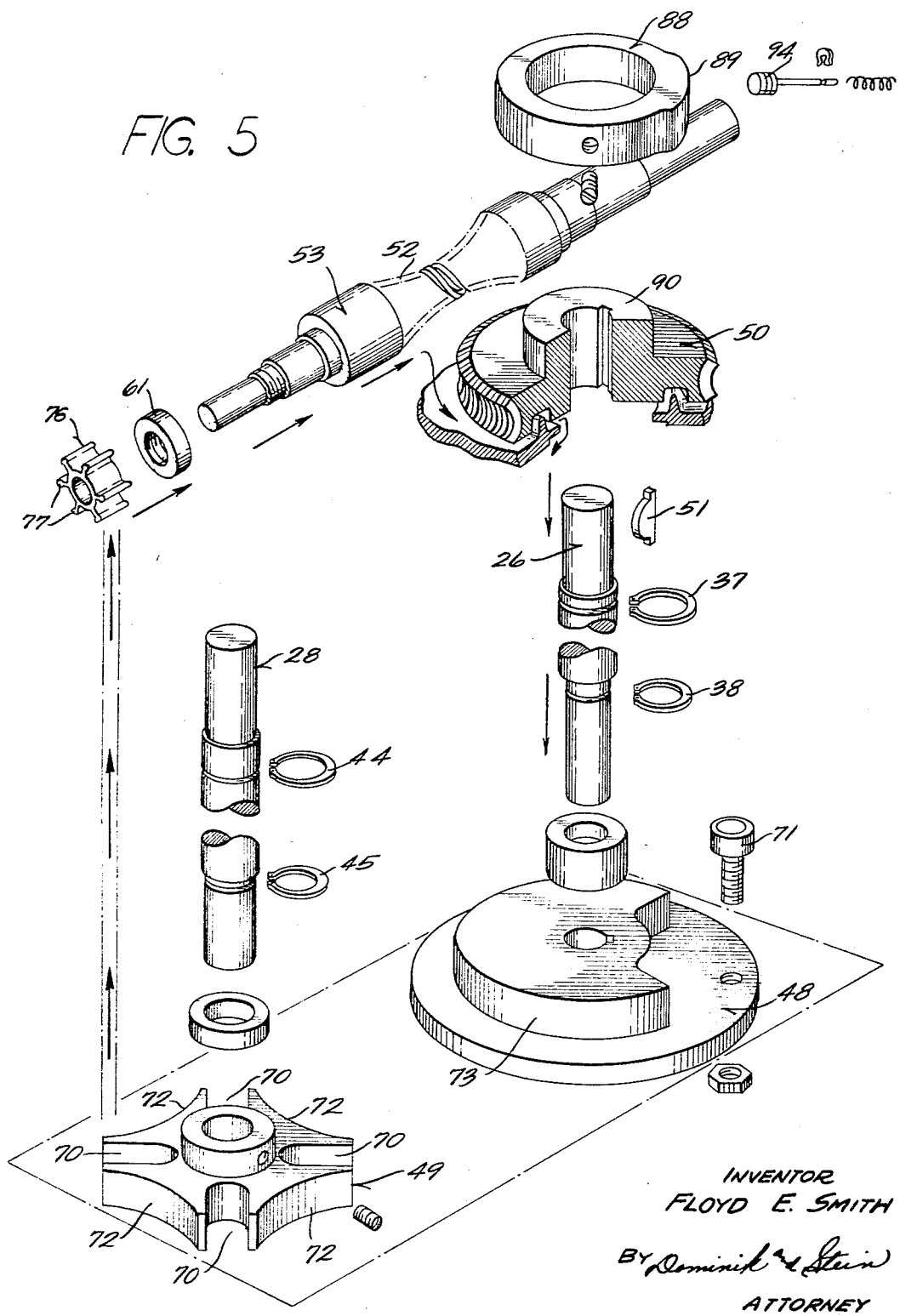

United States Patent Office

3,396,611
Patented Aug. 13, 1968

3,396,611
LUBRICATING SYSTEM FOR A GENEVA MOTION APPARATUS
Floyd E. Smith, 5704 Brewster Lane,
Erie, Pa. 16505
Filed Jan. 13, 1966, Ser. No. 520,441
5 Claims. (Cl. 74—820)

ABSTRACT OF THE DISCLOSURE

A lubricating system which provides a positive and continuous circulation of oil to the driving and driven members of a motion converting apparatus.

---

This invention relates to apparatus for converting continuous motion into precise intermittent motion. More particularly, the invention relates to a worm drive and lubrication system for apparatus of this type employing the Geneva motion principle.

Apparatus for converting continuous motion into intermittent motion employing the Geneva motion principle generally include a constantly rotating driver and a driven wheel. The driven wheel may have a number of radial slots, and a matching cam follower on the driver engages one of these slots on each revolution of the driver, thereby indexing the wheel. A concave section between the radial slots is formed to mate with a locking hub on the driver, to prevent movement of the wheel during dwell.

Apparatus of this type is generally well known in the industry and is used for a whole host of applications, such as for driving indexing turrets on automatic assembly equipment and other machines requiring intermittent motion such as press feed tables, packaging machines, machine tools, switch gear, and piece part feeding devices.

In the past, the driver and the driven wheel were generally affixed to respective ones of a pair of vertically aligned shafts which were rotatably supported in a sturdy mounting or bearing block. A source of power such as a gear box driven by an electric motor or the like was coupled to the driver shaft by a chain drive, a pulley drive or the like. Considerable effort has been made to provide a more positive drive; however, no satisfactory drive had been provided prior to the advent of the present invention. The heavy thrust loads and the torque loads transmitted to the driven wheel or, more particularly, the output shaft of the driven wheel, present an extreme burden on the input shaft. Many positive drives have been proposed but were found to be unsatisfactory in that they could not withstand these loads and, in addition, could not be properly lubricated. It is found that the operation of the apparatus and the loads encountered require considerable lubrication for the drive elements, otherwise their useful life is relatively short.

Accordingly, it is an object of the present invention to provide an improved positive drive and lubrication system for apparatus for converting continuous motion to intermittent motion by the use of the Geneva motion principle. In this respect, it is contemplated to use a worm gear drive, to provide a positive drive system.

It is a further object to provide a positive drive for apparatus of the latter type having an axis of drive parallel with the plane of rotation of an indexing table or the like affixed to the output shaft.

It is still another object to provide positive lubrication of the drive elements of apparatus of the described type. In this respect, it is contemplated that the lubrication system will have a splash system and a high level sump beneath the drive elements for initial lubrication.

It is still another object to provide a positive lubrication system for apparatus of the type described wherein adequate cooling is provided by means of an impeller which provides circulation of the lubricant and which provides a flow of lubricant between the interfacial area of the drive elements.

The invention accordingly, comprises the features of construction, combination of elements, and arrangements of parts which will be exemplified in the construction hereinafter set forth, and the scope of the invention will be indicated in the claims.

The above objectives are accomplished with the apparatus of the present invention which comprises, generally, a driver and a driven wheel adapted to impart a Geneva motion, to intermittently rotate an output shaft. A worm gear is affixed to the input shaft and a worm is operatively positioned to drive it, and hence the input shaft. The drive shaft of the worm is properly supported for rotation, and its terminal end has an impeller secured to it so that the impeller is rotated with the worm drive shaft. A housing for the apparatus functions as an oil reservoir and the driver and driven wheel extend into and are kept lubricated by the oil therein. The housing also functions as a sump from which the impeller is adapted to extract oil and to circulate it through the apparatus. A circular weir is formed beneath the worm wheel and the oil which is circulated is partially retained within the weir to provide initial lubrication for the worm drive. When the circulated oil reaches a fixed depth, it overflows and circulates back into the oil reservoir formed by the housing. With this arrangement, which is described more fully hereinafter, a positive drive and positive lubrication for the apparatus is provided.

For a fuller understanding of the nature and objects of the invention, reference should be had to the following detailed description taken in connection with the accompanying drawings, in which:

FIG. 5 is an exploded perspective view of the drive elements and the driver and driven wheel which imparts the intermittent motion to the output shaft, and the flow of oil therethrough.

Similar reference characters refer to similar parts throughout the several views of the drawing.

Figure 1:
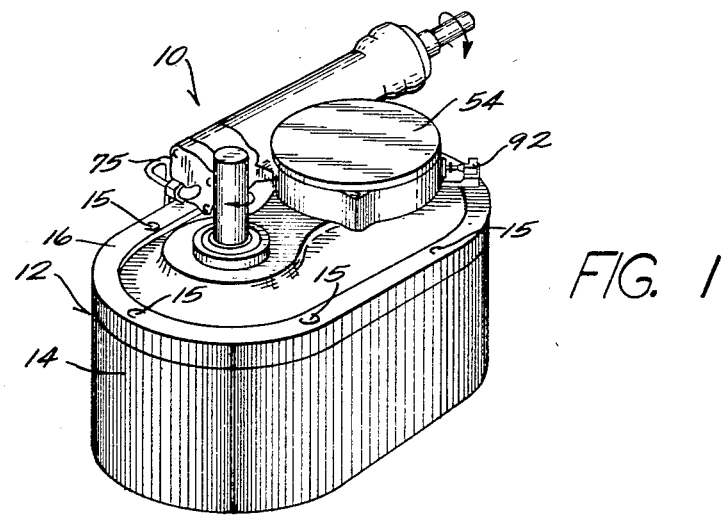
FIG. 1 is a perspective view of apparatus exemplary of the present invention.

In FIG. 1 there is illustrated apparatus 10 for converting continuous motion into intermittent motion using the Geneva motion principle. The apparatus 10 has a housing 12 including a base 14 and a cover plate 16 which is removably affixed by fastening means such as threaded screws 15 to the base 14 so as to seal the interior cavity within the base 14. Suitable gasket means (not shown) may be placed between the mating faces of the base 14 and the cover plate 16 to provide a better seal. Also, dowel pins (not shown) may be incorporated into the mating edges of the base and the cover plate to assure proper alignment when assembling them.

Figure 2:
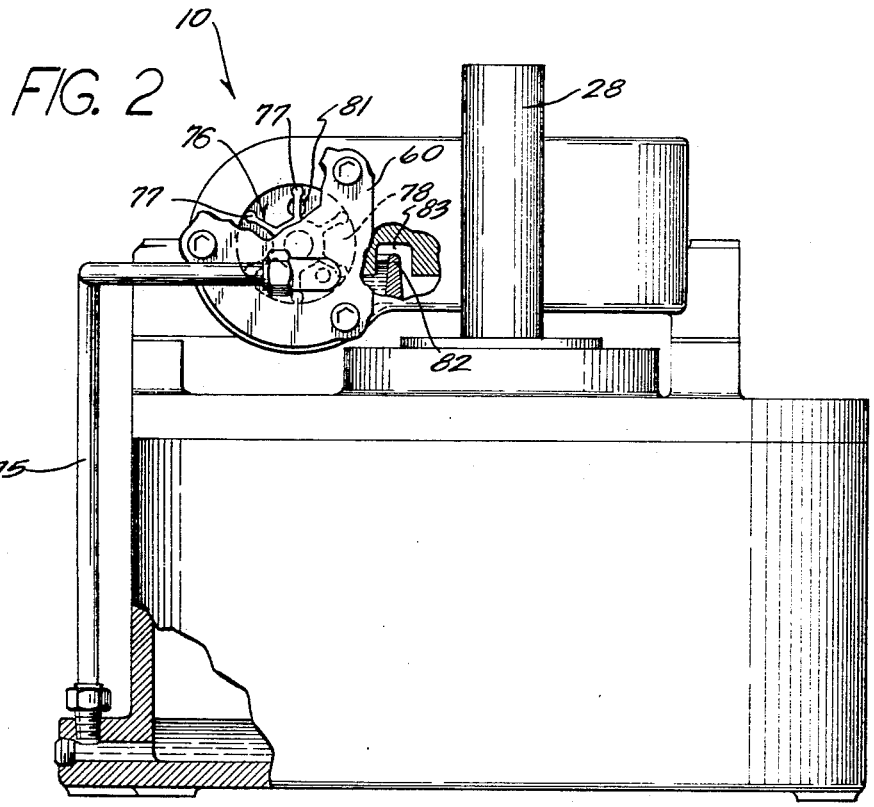
FIG. 2 is a side plan view of the apparatus of FIG. 1, partially broken away to illustrate the impeller, the weir and the oil reservoir.
Figure 4:
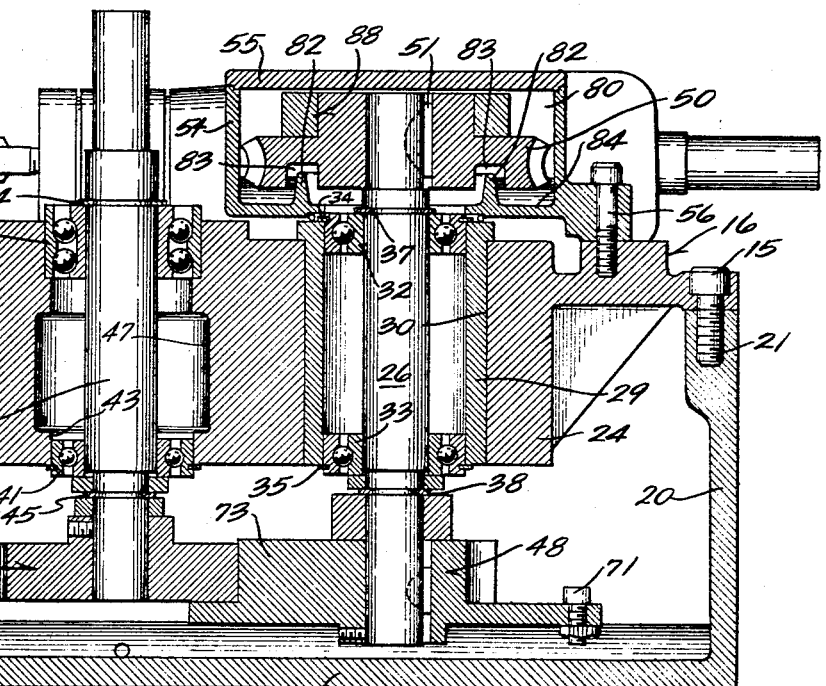
FIG. 4 is a sectional view taken substantially transversely through the apparatus of FIG. 1, to illustrate its interior construction.

The base 14, as can be best seen in FIGS. 2 and 4, has a flat bottom wall 18 and side walls 20. The upper end of the side walls 20 are substantially thickened so that threaded apertures 21 (only one shown in FIG. 4) can be formed therein for receiving the threaded screws 15. The base 14 functions as an oil reservoir for oil for lubricating the apparatus 10, in the manner described below.

The cover plate 16, as can be best seen in FIGS. 2 and 4, has a substantially flat top 22 which corresponds in size and shape to the upper rim or edge of the base 14. An enlarged portion 24 formed on the underside of the cover plate 16 forms a bearing and shaft support for an input shaft 26 and an output shaft 28. An eccentric bearing case 29 is secured within an aperture 30 formed through the enlarged portion 24 of the cover plate 16, and a pair of bearings 32 and 33 are retained therein at its upper and lower ends, respectively, by retaining rings 34 and 35. The input shaft 26 is retained within the bearings 32 and 33 by retaining rings 37 and 38.

The output shaft 28 is retained within bearings 40 and 41 secured within an aperture 43 extending through the enlarged portion 24, in spaced relation to the aperture 30. Retaining rings 44 and 45 are provided for securing the output shaft 28 within the bearings 40 and 41. A cavity 47 may be formed in the enlarged portion 24, about the output shaft 28, and appropriate gear means may be secured to the output shaft within said cavity to provide a horizontally disposed output drive shaft, if desired. In such an event, an appropriate aperture for the horizontally disposed output shaft would be formed in the side wall 20 of the base 14.

Affixed to the lower ends of the input shaft 26 and the output shaft 28, within the cavity of the base 14 is the driver 48 and the driven wheel 49 which convert the continuous rotational motion of the input shaft 26 into intermittent motion of the output shaft 28, using the Geneva motion principle. As can be best seen in FIG. 5, the driven wheel 49 has four radial slots 70, and the driver 48 has a cam follower 71 which engages one of the radial slots 70 on each revolution of the driver 48, or input shaft 26, thereby indexing the driven wheel 49. The concave sections 72 between the radial slots 70 are formed to mate with a locking hub 73 on the driver 48, to prevent movement of the driven wheel 49 during dwell. In the illustrated example, the driven wheel 49 and hence the output shaft 28 is indexed 90° on each revolution of the driver 48 or input shaft 26. This operation is well known and does not form a part of the invention so a detail description is dispensed with. Numerous other driver and driven wheel arrangements may be substituted to provide different modes of operation. Reference may be had to the literature distributed by the Geneva Motions Corp., 404 S. Jupiter Ave., Clearwater, Fla. for a complete description of the components and their operation.

Figure 3:
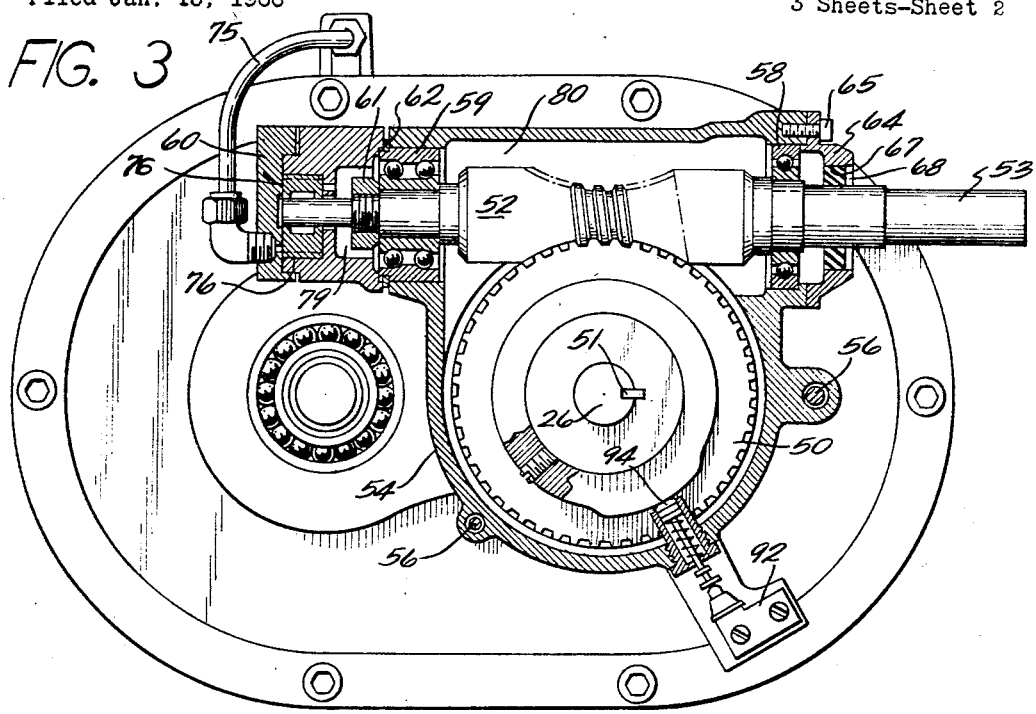
FIG. 3 is a top plan view of the apparatus of FIG. 1, partially sectionalized to illustrate the drive elements thereof.

A worm gear 50, which can be best seen in FIGS. 3, 4 and 5, is fixedly secured by means of a key 51 to the upper end of the input shaft 26. A worm 52 formed as an integral part of a drive shaft 53 is adapted to drive the worm gear 50 and hence rotate the input shaft 26. The worm 52 and the worm gear 50 are both sealed within a housing 54 secured to the cover plate 16, by means of fastening means such as the threaded screws 56. A removable cover plate 55 is provided for the housing 54 so that access may be made to the drive assembly without completely disassembling it. The drive shaft 53 is rotatably retained within bearings 58 and 59 secured within the housing 54 and its end is journalled within an end wall 60 of the housing 54. A lock nut 61 is threadedly fixed to the drive shaft 53 and abuts the race of the bearing 59 to fixedly position the drive shaft 53 against lateral movement. The bearing 59 is fixedly retained within the housing 54, by means of a lock ring or clip 62. The bearing 58 is positionally fixed by means of a dust cover 64 fixedly secured by fastening means such as thread screw 65 to the housing 54. The drive shaft 53 extends through an aperture 67 in the dust cover and a seal 68 is fixedly secured about the drive shaft to prevent dirt from entering the dust cover 64. A source of power (not shown) is connected to the drive shaft 53 for rotating it, and this motion is transmitted via the worm 52 to the worm gear 50 to rotate the input shaft 26. The rotation of the input shaft 26 is converted by the driver 48 and the driven wheel 49, using the Geneva motion principle, to intermittently rotate, or index, the output shaft 28. As indicated above, numerous positive drive arrangements have been designed for apparatus of this type, but the heavy thrust loads and the torque loads transmitted to the driven wheel have caused rapid deterioration of these drives and the drives are rendered inoperative in a relatively short period of operation.

The worm gear drive described above overcomes these deleterious effects and, in addition, provides a positive drive which has an axis of drive parallel with the plane of rotation of an indexing table (not shown) or the like affixed to the output shaft 28. A more positive drive is therefore provided since the gear means generally employed in the past with apparatus of this type are eliminated. Furthermore, with the elimination of these gear means, a greatly simplified and less costly drive is provided.

The success of the worm gear drive arrangement of the present invention is contributed to the positive lubrication provided during operation and to the initial lubrication provided prior to operation of the apparatus 10. Each of these contributes to the successful operation by assuring proper lubrication and adequate cooling for the worm gear drive. The same system or arrangement for lubricating the worm gear drive provides lubrication for the bearings and the driver and driven wheel, as described below.

In FIGS. 2, 3 and 5, it can be seen that the base 14 functions as an oil reservoir, and a level of oil is maintained in it that is at least sufficient to splash oil over the driver 48 and the driven wheel 49 during operation. An oil line 75 leads from the lower end of the base 14 to the end wall 60 of the housing 54 for the worm gear 50 and worm 52. A pump in the form of an impeller 76 (FIGS. 2, 3 and 5) having a number of radially extending blades 77 is affixed to the terminal end of the drive shaft 53, within an eccentric pump cavity 78. As the drive shaft 53 is rotatably driven, the impeller 76 is likewise rotated and draws oil from the oil reservoir in the base 14, through the oil line 75 and directs it into the housing 54. The oil drawn from the oil reservoir flows into and substantially fills an oil cavity 79 to lubricate the bearing 59, and from the oil cavity 79 it flows through an output port 81 into another larger oil cavity 80 surrounding the worm 52 and the worm gear 50. The oil from the output port 81 flows into the oil cavity 80 from its top so as to be spilled over the worm 52 to lubricate it. Also, the flow of oil into the oil cavity 80 is sufficient to maintain an adequate oil level to provide constant lubrication for the worm 52 and the worm gear 50. From the oil cavity 80, the oil flows through the bearings 32 and 33 and about the input shaft 26, back into the oil reservoir in the base 14. The oil is cooled in the reservoir, and recirculated in the manner described above, to provide a constant flow of cooled oil to the interfacial area between the worm 52 and worm gear 50. It may be observed that the bearings, the driver and the driven wheel are also well lubricated with the same described circulation of oil.

Initial positive lubrication is provided for the worm 52 and the worm gear 50 by forming a weir 82 (FIGS. 2, 4 and 5) on the bottom wall 84 of the housing 54 and by forming an annular groove 83 in the underside of the worm gear 50 which overlies the weir 82. As can be seen in FIGS. 2 and 4, the weir 82 provides a high level sump for the oil flowing into the oil cavity 80. The lower portion of both the worm 52 and the worm gear 50 are immersed in the oil retained by the weir so that both are initially lubricated upon starting operation of the apparatus 10. As oil flows into the oil cavity 80, the oil level gradually rises, rather rapidly, and will overflow the weir 82 so that the oil circulates through the system in the manner described above. This constant flow of oil is generally depicted in FIG. 5 wherein it can be seen that the oil is drawn through the oil line 75 from the oil reservoir by the impeller 76 and flows into the oil cavity 80. Prior to initiating operation of the apparatus 10, the weir 82 maintains an oil level in the oil cavity 80 sufficient to provide positive lubrication for the worm 82 and the worm gear 80. Upon commencement of the operation of the apparatus 10, additional oil is drawn from the oil reservoir, and eventually the oil level in the oil cavity 80 rises to overflow the weir 82, to flow through the bearings 33 and 34 and about the input shaft 26 back into the oil reservoir in the base 14. With this positive lubrication arrangement, it is found that the positive worm gear drive has a long useful life and is substantially maintenance free.

A cam wheel 88 having a cam surface 89 can be affixed to the input shaft 26, or about a hub 90 of the worm gear 50, as illustrated, to operate a microswitch 92 or other control device. A spring loaded plunger 94 extends through an aperture formed in the side wall of the housing 52 and engages the cam surface 89 as the cam wheel 88 rotates. Engagement of the plunger with the cam surface will actuate the microswitch 92. Microswitch 92 can, in turn, be used to control the operation of an associated apparatus.

The oil pump, or more particularly, the impeller 76, as can be best seen in FIG. 5, can be a six pronged rubber spider. The impeller is mounted in the eccentric oil pump cavity 78 and, with this construction, it is immaterial which direction the drive shaft 53 is rotated. The oil is merely conveyed from one side of the terminal end of the drive shaft 53 where the cavity is greater, to the output port 81. The apparatus 10 can therefore be operated in either direction of rotation, and positive lubrication of its components is still provided.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. Apparatus for converting continuous motion into intermittent motion, using the Geneva motion principle, comprising in combination: a base forming an oil reservoir for said apparatus; an input shaft and an output shaft each having one end thereof extending into said base and having a driver and a driven wheel affixed thereto, respectively, which are normally at least partially immersed in and lubricated with oil in said oil reservoir, said driver and said driven wheel being adapted to convert continuous rotational motion of said input shaft to intermittent motion of said output shaft using the Geneva motion principle; a drive shaft having a worm formed as an integral part thereof; a worm gear affixed to said input shaft driven by said worm; a housing enclosing said worm and worm gear affixed to said base and being in communication with said oil reservoir; an oil pump affixed to a terminal end of said drive shaft for drawing oil from said oil reservoir and delivering said oil into said housing; means within said housing for establishing a predetermined oil level therein for providing positive initial lubrication for said worm and worm gear; said oil delivered into said housing being delivered back into said oil reservoir when its level exceeds said predetermined level, whereby both positive initial lubrication and a continuous circulation of oil through said apparatus is provided to lubricate said worm, said worm gear, said driver and said drive wheel from a single oil reservoir which comprises an integral part of said apparatus.

2. Apparatus, as claimed in claim 1, wherein said means for establishing a predetermined oil level within said housing comprises an annular groove formed in said worm gear; and a weir formed on said housing and projecting into said annular groove; said weir retaining oil within said housing and when the level of said oil exceeds the height of said weir being delivered back into said oil reservoir.

3. Apparatus, as claimed in claim 1, wherein said input and output shafts are vertically aligned and wherein said drive shaft has an axis perpendicularly aligned thereto.

4. Apparatus, as claimed in claim 1, wherein said oil pump comprises an impeller affixed to the terminal end of said drive shaft and within an eccentric oil cavity.

5. Apparatus, as claimed in claim 3, wherein the oil is delivered from said oil cavity and spilled on said worm within said housing.

References Cited

UNITED STATES PATENTS

| 1,090,383 | 3/1914 | Cantrell et al. | 74—467 |
| 1,953,068 | 4/1934 | Barker | 184—11 |
| 2,581,123 | 1/1952 | Merkle | 184—6 X |
| 2,589,486 | 3/1952 | Emrick | 74—820 X |
| 3,095,063 | 6/1963 | Eskenazi | 184—6 |

FOREIGN PATENTS 839,453  5/1952  Germany.

HALL C. COE, *Primary Examiner.*